Jan. 2, 1934.    M. J. KERMER    1,941,693
EVAPORATOR
Filed April 15, 1932
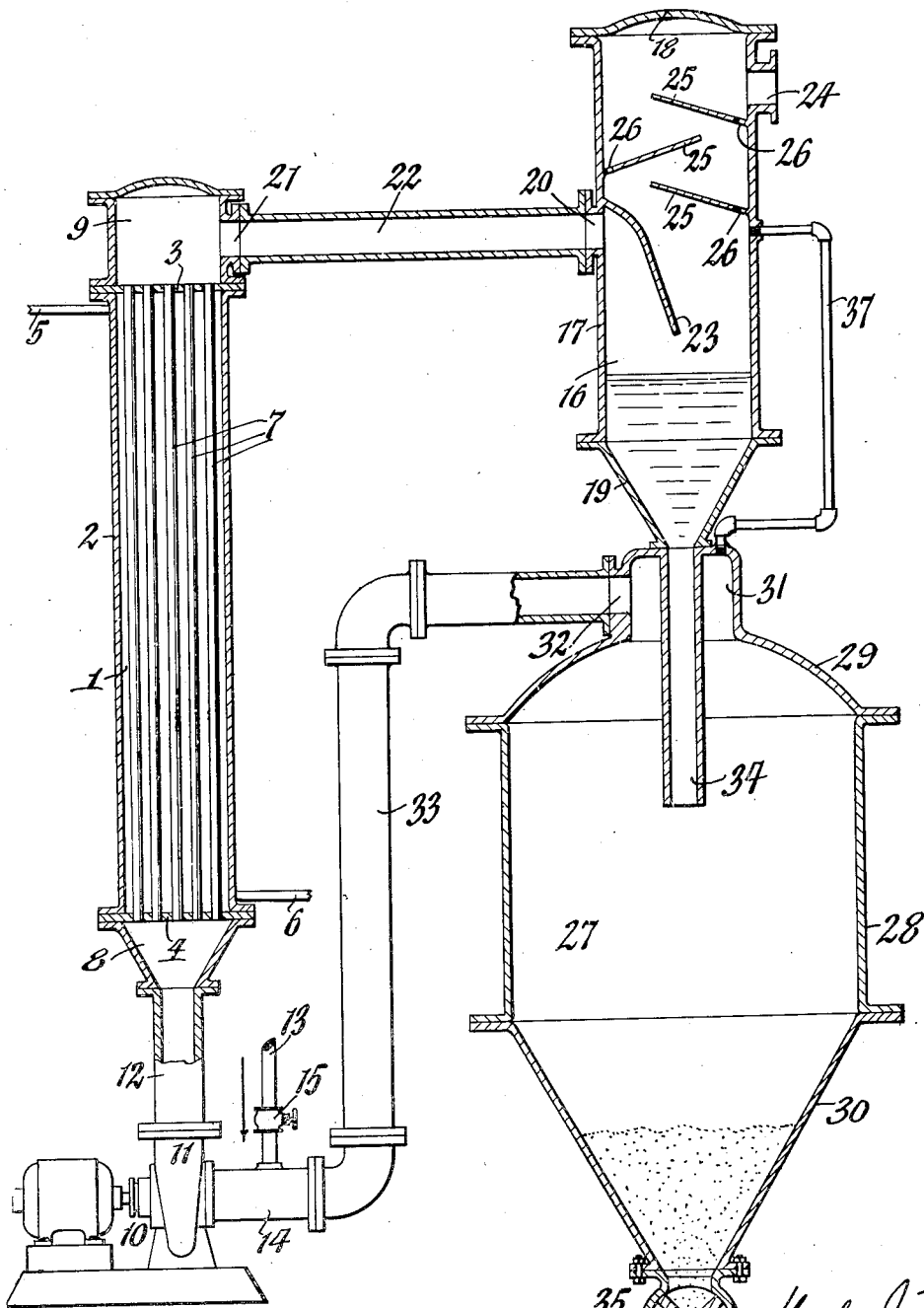
Martin J. Kermer
INVENTOR
BY Popp & Powers
ATTORNEYS Patented Jan. 2, 1934

1,941,693

UNITED STATES PATENT OFFICE 1,941,693

EVAPORATOR

Martin J. Kermer, Buffalo, N. Y., assignor to Buffalo Foundry & Machine Company, Buffalo, N. Y., a corporation of New York Application April 15, 1932. Serial No. 605,480

2 Claims. (Cl. 159—45)

This invention relates to an evaporator and more particularly to means whereby entrainment of liquid in the vapors escaping from the evaporator is reduced to a minimum and the maximum amount of salts or crystals are recovered for a given expenditure of heat and power.

The entrainment of liquid in the vapors while the evaporator is in operation is due principally to two causes. One of these causes is due to the formation of a large amount of foam in the catch-all in which the foam, unless prevented, will creep up along the side walls of the catch-all and thence escape into the steam chamber of the next following effect, or be lost in the condenser or the exhausting device which produces a vacuum in the evaporator. The other cause is due to the fine particles of liquor passing from the heater over to the catch-all and being carried off to the vapor outlet of the catch-all by the vapor which rises from the boiling liquor in the catch-all.

One of the objects of this invention is to prevent or at least reduce the entrainment of liquid in the escaping vapor so that only an inappreciable amount of liquid escapes with the vapors. This is accomplished by reducing the cross sectional area of the catch-all and providing the same with a tapered bottom so that the foam formed therein will be destroyed by the incoming stream of liquid from the heater and thus constantly knock down the foam and prevent or reduce the tendency of the same to rise in the catch-all and escape through the vapor outlet at the upper end of the latter. To further reduce the liability of any entrainment of liquid in the escaping vapors the upper part of the catch-all is restricted in cross sectional area so as to increase the velocity of the escaping vapors and also provide baffle means in the upper part of the catch-all which intercepts the liquid in the vapors and returns the same to the body of liquid in the catch-all.

A further object of this invention is to so construct the means for separating the salts or crystals from the liquid before the same is returned to the heater that the liquid will travel at a comparatively low velocity at this time and thus permit the salts to be separated from the liquid and avoid the liability of carrying the salts or crystals over into the heater. This last-mentioned object is attained by drawing off the liquid from the upper end of the crystal or salt separator around the inlet for the crystal laden liquid which extends downwardly through the central part of the top of the crystal separator, and thus compels the liquid from this inlet to spread laterally in all directions and then pass through the outlet in the central part of its top, thus slowing up the movement of the liquid without reducing the volume and enabling the crystals to readily precipitate and collect in the lower part of the crystal separator body, from which they may be discharged in any suitable manner.

The accompanying drawing is a vertical section of the preferred form of apparatus embodying my invention.

In its general organization this evaporator comprises a heater whereby the liquid containing the crystallizable ingredients are heated, a catch-all which receives the heated vapors and in which the vapors and liquids are separated, a liquid and crystal separator which receives the crystal laden liquid from the catch-all and separates the crystals therefrom, and a pump which removes the liquid from the separator and returns the same to the heater so that this liquid is circulated in the apparatus and repeatedly subjected to the heating operation and the vapors and crystals are carried off from the apparatus as they are formed.

The heater may be of any suitable construction and that shown in the drawing is therefore to be regarded merely as an example of one suitable for the purposes of this invention. As there shown this heater has a heating chamber 1 which is formed within an upright body 2 and upper and lower flue sheets 3 and 4 connected with the respective ends of the body. Into this heating chamber a heating medium of any suitable character may be introduced, such as steam, which may be supplied to the upper end of this heating chamber by means of a pipe 5 and the water of condensation may be drawn from the lower end of this chamber through a drain pipe 6.

Within the heating chamber is arranged a cluster of upright heating tubes 7 which are connected with the lower and upper flue sheets 4 and 3 and open downward and upwardly therefrom. The liquid to be heated moves upwardly through these tubes and during this passage the same is heated by steam or other heating medium surrounding the same within the heating chamber 1.

At the lower end of the heater body is arranged an inlet chamber 8 from which the liquid to be heated is supplied to the lower ends of the several heating tubes 7, and above the heater body is arranged an outlet chamber or dome 9 into which the heated liquid and the vapors produced by heating thereof are discharged from the upper ends of the tubes.

The liquid to be heated is preferably supplied to the lower inlet or supply chamber 8 by means of a pump 10 which has its outlet 11 connected by means of a pipe 12 with the inlet chamber 8 and causes the liquid to flow rapidly upwardly through the heating tubes and thereby accelerate the heating of the same. Fresh liquid to be treated may be supplied to the apparatus in any suitable manner, for example by means of a supply pipe 13 connecting with the inlet 14 of the pump and provided with a valve 15 for controlling the supply of fresh liquid as desired.

The catch-all has an upright separating chamber 16 which is formed between an upright body 17, and a cover 18 which closes the top of the body 17, and a downwardly tapering bottom 19 which connects with the lower end of this body. Between its upper and lower ends the body of the catch-all is provided with an inlet 20 for the vapors and crystal laden liquid which issues from the upper end of the heating tubes, said vapors and liquid being delivered from an outlet opening 21 in the side of the outlet chamber 9 to the inlet 20 of the catch-all by means of a conduit 22.

As the vapors and liquid enter the separating chamber 16 of the catch-all the same are deflected downwardly by an inclined deflector 23 which is arranged opposite the inlet 20 and is connected at its upper end with the adjacent part of the side wall or body of the catch-all above the inlet 20 and terminates at a point within the central part of the catch-all chamber below said inlet 20. By means of this deflector 23 the vapors and the salt or crystal laden liquid are directed downwardly upon entering the catch-all chamber, and due to the weight of the liquid the same continues its downward course toward the bottom of the catch-all chamber but the vapors contained therein separate from the liquid upon reaching the lower end of the deflector 23 and pass upwardly therefrom into the upper part of the vapor and liquid separating chamber of the catch-all. Ultimately this vapor escapes through an outlet 24 at the upper end of the catch-all chamber which may be connected with the next following effect of the evaporating apparatus or the same may be connected with the condenser or an exhausting device for the purpose of creating a vacuum within the evaporator and thereby accelerate the evaporating operation by the separation of the vapors and crystals from the liquid.

In order to prevent the escape of any liquids through the outlet 24 which may become entrained in the vapors which pass upwardly from the lower end of the deflector 23 toward the outlet 24, baffle means are arranged in the upper part of the catch-all chamber which are so formed that they produce a restriction in the cross sectional area of the passage through which such vapors must pass but also compel the vapors to take a circuitous, zig-zag or serpentine course before escaping through the outlet 24 and thereby operate to separate from these vapors any liquid which may be come entrained therein.

In the preferred construction these baffles may consist of a plurality of inclined baffles 25 which are arranged in staggered position relatively to each other in the upper part of the catch-all chamber. By connecting the outer end of each of these baffles alternately with the interior of the catch-all body on one side thereof and terminating its inner edge short of the inner side of the opposite wall of the catch-all chamber, the inner ends of the several baffles overlap each other but are spaced apart from each other and from the body or wall of the catch-all chamber. Each of these baffles preferably inclines from its inner end downwardly to the adjacent part of the wall or body of the catch-all chamber and is provided at its lower end with a drain hole 26.

As the vapors pass from the lower edge of the deflector 23 upwardly in the body of the catch-all the same first engage the lowermost baffle 25 and are deflected thereby toward the opposite side of the catch-all chamber, then these vapors engage with the underside of the next upper baffle 25 and are thereby reversed in their movement, and then the vapors engage in like manner with the next upper baffle and are again reversed in the direction of movement, this operation being repeated in accordance with the number of the baffles which are employed so that the vapors take a tortuous course before the same can escape through the outlet 24 at the upper end of the catch-all body. As the vapors successively engage the undersides of the baffles and the adjacent parts of the wall of the catch-all body the speed of the same is increased due to the restriction of the passage through which the vapors are compelled to pass, and any entrained liquid therein is deposited on the undersides of these baffles and the adjacent walls of the catch-all body. This liquid flows down the underside of the baffles and along the inner side of the catch-all wall to the liquid within the lower part thereof, and any liquid which may be deposited on the upper sides of the several baffles or on the inner side of the catch-all body above the baffles will be directed toward the drain openings 26 in the lower ends of the baffles, from which point this liquid drops down into the liquid at the lower end of the catch-all body.

When the apparatus is in normal operation the liquid level in the same is located at a point somewhere between the lower end of the deflector 23 and the bottom of the catch-all body, as shown in the drawing. This liquid is then delivered into the separator which is arranged below the catch-all body, which separator operates to eliminate the salts or crystals from the liquid preparatory to returning the unevaporated liquid to the heater for recirculation in the apparatus.

The particular form of this liquid and salt or crystal separator may be varied in its detailed construction, but that shown in the drawing has been found satisfactory and as there shown is constructed as follows:

The numeral 27 represents the liquid and salt or crystal separating chamber which is formed within an upright body 28, a head 29 connected with the upper end of this body, and a downwardly or tapering conical body 30 connecting with the lower end of this body.

On the central part of the head or cover 29 forming the top of the separating chamber 27 is an upwardly projecting dome 31 which is preferably concentric with the separating chamber. This dome is provided on one side with an outlet 32 which is connected by a return pipe 33 with the inlet of the pump 10. Arranged centrally within the dome 31 and projecting downwardly therefrom is an upright delivery tube 34 which communicates at its upper end with the lower or small end of the conical bottom 19 of the catch-all body while the lower end of this delivery tube terminates below the lower end of the dome 31 and at a point below the top or head of the separating chamber.

At the lower or small end of the conical bottom 30 of the liquid and salt separating chamber is arranged a valve whereby the crystals or salts may be removed from the lower part of the separating chamber without interfering with the normal operation of the apparatus. The valve shown in the drawing, as an example for this purpose, consists of a rotary multiple wing discharge wheel 35 which is arranged within a circular body 36 connected at its upper end with the lower end of the separator bottom 30, while its lower or outlet end may lead to any suitable place to which the salts or crystals are to be delivered.

For the purpose of preventing the accumulation of air in the upper end of the separating chamber which otherwise would cause the apparatus to become air-bound, an air balancing pipe 37 is provided which connects the uppermost part of the dome 31 with the interior of the catch-all chamber at a point above the lower end of the deflector 23.

As the salt or crystal laden liquid issues from the lower end of the delivery tube 34 the salts or crystals in this liquid, due to their greater weight, drop into the lower part of the separating chamber, from which they are removed through the discharge valve as required, while the liquor freed from salts or crystals passes upwardly from the lower end of the delivery tube 34 into the dome 31 and thence outwardly through the outlet 32 and pipe 33 to the pump 10, which latter again forces this liquid upwardly through the tubes of the heating apparatus in order to again circulate the liquid through the evaporator.

The liquid passes downwardly through the tube 34 at a considerable velocity so that the heavier salts or crystals therein are thrown with greater force toward the bottom of the separating chamber, but as the liquid reverses its course in an upper direction from the lower end of the delivery tube 34 to the outlet dome at the upper end of the separating chamber, this liquid spreads out radially in all directions and as the liquid at this time travels through a passage which is of very much greater cross sectional area than the delivery tube 34, the speed of movement or velocity of the liquid at this time is reduced to a comparatively low point, whereby the salts or crystals in the liquid are given further time to separate from the liquid and drop to the bottom of the separating chamber, thus reducing to a minimum the liability of carrying salts or crystals from the separating chamber over into the heating apparatus.

By arranging the liquid outlet for the separator centrally on the top of the separating chamber and preferably concentrically around the delivery tube 34 the entire circumferential space within the upper part of the separating chamber is utilized as a path for the liquid in its passage to the liquid outlet of the separating chamber and thus insures the maximum separation of the salts or crystals from the liquid before the latter are returned to the heater. No dead space is therefore formed in the upper part of the separating chamber which would be practically inactive so far as any effect in separating crystals or salts from the liquids is concerned, similar to that which occurs in separating chambers having the liquid outlet arranged at the extreme side or peripheral part of the separating chamber as has been the case in separators of this character as heretofore constructed.

As a whole this evaporator permits of effecting evaporation of liquids and recovering the salts or crystals therein very rapidly and thoroughly and at a minimum expenditure of power and heat, thereby enabling this operation to be accomplished more economically and profitably than has been possible heretofore.

I claim as my invention:—

1. An evaporator comprising a liquid and crystal separator having a body provided on top with a central dome of smaller diameter than said body, a liquid outlet in the upper part of said dome, a crystal outlet at the bottom of the body, and an inlet pipe for crystal laden liquid projecting downwardly through the central part of said dome into the central part of said body.

2. An evaporator comprising a liquid and crystal separator having a body provided on top with a central dome of smaller diameter than said body, a liquid outlet in the upper part of said dome, a crystal outlet at the bottom of the body, an inlet pipe for crystal laden liquid projecting downwardly through the central part of said dome into the central part of said body, the lower part of said body tapering downwardly and having said crystal outlet at its lower end, and a valve for controlling said crystal outlet.

MARTIN J. KERMER.